(12) United States Patent
Kolda et al.

(10) Patent No.: US 10,377,209 B2
(45) Date of Patent: *Aug. 13, 2019

(54) ELECTRICAL TRANSPORT REFRIGERATION SYSTEM

(71) Applicant: THERMO KING CORPORATION, Minneapolis, MN (US)

(72) Inventors: Michal Kolda, Prague (CZ); Michal Hegar, Prague (CZ); Vladimir Kmoch, Prague (CZ); Vaclav Rajtmajer, Beroun (CZ)

(73) Assignee: Thermo King Corporation, Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/691,177

(22) Filed: Aug. 30, 2017

(65) Prior Publication Data

US 2018/0015808 A1 Jan. 18, 2018

Related U.S. Application Data

(63) Continuation of application No. 14/430,075, filed as application No. PCT/US2013/060847 on Sep. 20, 2013, now Pat. No. 9,776,473.

(Continued)

(51) Int. Cl.
*B60H 1/00* (2006.01)
*B60H 1/32* (2006.01)
(Continued)

(52) U.S. Cl.
CPC ....... *B60H 1/3222* (2013.01); *B60H 1/00428* (2013.01); *B60H 1/3232* (2013.01);
(Continued)

(58) Field of Classification Search
CPC combination set(s) only.
See application file for complete search history.

(56) References Cited

U.S. PATENT DOCUMENTS

| 5,245,836 A | 9/1993 | Lorentzen et al. |
| 5,524,681 A | 6/1996 | Davies et al. |

(Continued)

FOREIGN PATENT DOCUMENTS

| CN | 101659186 | 3/2010 |
| EP | 1279907 | 1/2003 |

(Continued)

OTHER PUBLICATIONS

European Office Action issued in European Application No. 13838098.5 dated May 9, 2018 (7 pages).

(Continued)

*Primary Examiner* — Elizabeth J Martin
(74) *Attorney, Agent, or Firm* — Hamre, Schumann, Mueller & Larson, P.C.

(57) ABSTRACT

Examples of an electrically powered transport refrigeration unit (TRU) are disclosed. The TRU may include a refrigeration circuit that includes an electrically powered compressor, an evaporator equipped with an electrically powered blower, and a gas cooler equipped with an electrically powered blower. The TRU may also include a control circuit and a power regulator unit. The power regulator unit may be configured to supply variable DC and/or AC outputs to power components of the refrigeration circuit, and the control circuit may be configured to regulate the variable DC and AC outputs of the power regulator unit so as to control the operation of the TRU. The electrically powered TRU may be configured to use R774 as refrigerant.

17 Claims, 6 Drawing Sheets

Related U.S. Application Data

(60) Provisional application No. 61/703,540, filed on Sep. 20, 2012.

(51) Int. Cl.
*B60P 3/20* (2006.01)
*F25B 1/10* (2006.01)
*F25B 43/00* (2006.01)

(52) U.S. Cl.
CPC .................................... *B60P 3/20* (2013.01);
*F25B 1/10* (2013.01); *F25B 43/006* (2013.01);
*F25B 2400/072* (2013.01); *F25B 2400/13*
(2013.01); *Y02T 10/88* (2013.01)

(56) References Cited

U.S. PATENT DOCUMENTS

| | | |
|---|---|---|
| 6,223,546 B1 | 5/2001 | Chopko et al. |
| 6,321,550 B1 | 11/2001 | Chopko et al. |
| 6,405,550 B1 | 6/2002 | Reason et al. |
| 6,543,242 B2 | 4/2003 | Reason et al. |
| 6,755,041 B2 | 6/2004 | Wessells et al. |
| 7,024,883 B2 | 4/2006 | Sienel et al. |
| 7,721,569 B2 | 5/2010 | Manole |
| 7,992,408 B2 | 8/2011 | Bush et al. |
| 3,037,704 A1 | 10/2011 | Viegas |
| 3,087,256 A1 | 1/2012 | Babkin et al. |
| 3,312,737 A1 | 11/2012 | Bush et al. |
| 9,776,473 B2 * | 10/2017 | Kolda ............... B60H 1/3222 |
| 2002/0108388 A1 | 8/2002 | Wilson et al. |
| 2002/0108389 A1 | 8/2002 | Wilson et al. |
| 2007/0000281 A1 | 1/2007 | Manole |
| 2008/0256974 A1 | 10/2008 | Verma et al. |
| 2008/0256975 A1 | 10/2008 | Lifson et al. |
| 2009/0193828 A1 | 8/2009 | Cocchi et al. |
| 2009/0211286 A1 | 8/2009 | Stauter et al. |
| 2009/0211287 A1 | 8/2009 | Steele et al. |
| 2009/0241566 A1 | 10/2009 | Bush et al. |
| 2010/0043475 A1 | 2/2010 | Taras et al. |
| 2010/0045105 A1 | 2/2010 | Bovio et al. |
| 2010/0050668 A1 | 3/2010 | Bush et al. |
| 2010/0071391 A1 | 3/2010 | Lifson et al. |
| 2010/0077777 A1 | 4/2010 | Lifson et al. |
| 2010/0077786 A1 | 4/2010 | Siegenthaler et al. |
| 2010/0083678 A1 | 4/2010 | Lifson et al. |
| 2010/0089083 A1 | 4/2010 | Awwad et al. |
| 2010/0095700 A1 | 4/2010 | Bush et al. |
| 2010/0115975 A1 | 5/2010 | Mitra et al. |
| 2010/0132399 A1 | 6/2010 | Mitra et al. |
| 2010/0147006 A1 | 6/2010 | Taras et al. |
| 2010/0171364 A1 | 7/2010 | Awwad |
| 2010/0263703 A1 | 10/2010 | Reichart et al. |
| 2010/0269523 A1 | 10/2010 | Asprovski et al. |
| 2010/0281894 A1 | 11/2010 | Huff |
| 2010/0326100 A1 | 12/2010 | Taras et al. |
| 2011/0000244 A1 | 1/2011 | Reason et al. |
| 2011/0011115 A1 | 1/2011 | Bushnell |
| 2011/0023514 A1 | 2/2011 | Mitra et al. |
| 2011/0030399 A1 | 2/2011 | Lifson et al. |
| 2011/0041523 A1 | 2/2011 | Taras et al. |
| 2011/0048041 A1 | 3/2011 | Asprovski et al. |
| 2011/0048042 A1 | 3/2011 | Chen et al. |
| 2011/0088411 A1 | 4/2011 | Steele et al. |
| 2011/0100040 A1 | 5/2011 | Bush et al. |
| 2011/0138825 A1 | 6/2011 | Chen et al. |
| 2011/0138886 A1 | 6/2011 | McDonald et al. |
| 2011/0162396 A1 | 7/2011 | Chen et al. |
| 2011/0174014 A1 | 7/2011 | Scarcella et al. |
| 2011/0209490 A1 | 9/2011 | Mijanovic et al. |
| 2011/0239668 A1 | 10/2011 | Qiao et al. |
| 2011/0247350 A1 | 10/2011 | Awwad et al. |
| 2011/0280750 A1 | 11/2011 | Flanigan |
| 2012/0085117 A1 | 4/2012 | Ikemiya et al. |
| 2012/0198868 A1 | 8/2012 | Huff et al. |
| 2012/0227427 A1 | 9/2012 | Liu et al. |
| 2012/0318008 A1 | 12/2012 | Liu et al. |
| 2012/0318014 A1 | 12/2012 | Huff et al. |
| 2013/0000342 A1 | 1/2013 | Blasko et al. |
| 2014/0026599 A1 | 1/2014 | Rusignuolo et al. |
| 2014/0223933 A1 | 8/2014 | Steele et al. |

FOREIGN PATENT DOCUMENTS

| | | |
|---|---|---|
| EP | 1555493 | 7/2005 |
| EP | 1935712 | 6/2008 |
| EP | 2084971 | 8/2009 |
| EP | 2439473 | 4/2012 |
| WO | 2011112411 | 1/2003 |
| WO | 2008094148 | 8/2008 |
| WO | 2009099429 | 8/2009 |
| WO | 2009140372 | 11/2009 |
| WO | 2011112495 | 9/2011 |
| WO | 2011112500 | 9/2011 |
| WO | 2012018537 | 2/2012 |

OTHER PUBLICATIONS

Chinese Office Action issued in Chinese Application No. 201380049142.0 dated Jun. 27, 2017 (10 pages).
Supplementary European Search Report issued in European Application No. 13838098.5 dated Jan. 5, 2017 (9 pages).
Chinese Office Action issued in Chinese Application No. 201380049142.0 dated May 10, 2016 (9 pages).
International Search Report and Written Opinion issued in International Application No. PCT/US2013/060847 dated Dec. 16, 2013 (13 pages).

* cited by examiner

ELECTRICAL TRANSPORT REFRIGERATION SYSTEM

FIELD OF TECHNOLOGY

The embodiments disclosed herein relate generally to a transport refrigeration system (TRS). More particularly, the embodiments relate to an electrically powered transport refrigeration unit (TRU) for the TRS.

BACKGROUND

Some transport refrigeration systems may be equipped with a temperature control system, such as a TRU, to control a temperature of internal spaces of a transport unit. The transport unit may be a trailer, a container, a railroad car, etc. A TRU can be attached to a wall of the transport units. The TRU typically includes a compressor, a condenser and an evaporator, forming a refrigeration circuit. Refrigerant is circulated in the refrigeration circuit to help heat transfer between the internal spaces of the transport unit and the ambient air. One example of a typically used refrigerant is R404A. A TRU using R404A refrigerant typically includes a compressor that is driven by a diesel engine, and a belt system to drive blowers of, for example, a condenser and an evaporator.

SUMMARY

Embodiments of an electrically powered TRU for a TRS are disclosed herein.

The electrically powered TRU may be configured to use a natural refrigerant, such as R744, resulting relatively low environmental impacts. The electrically powered TRU may eliminate the need for an internal combustion engine, such as a diesel engine, and may also help reduce operational noise levels. Also, by using an electrically powered TRU, refrigerant leakage can be reduced because a compressor of the TRU can be made fully hermetic.

Also, by using an electrically powered TRU, components, including for example, the compressor, one or more condenser or gas cooler blowers, one or more evaporator blowers and/or one or more heating rods can be individually controlled. Thus, the controls to the electrically powered TRU can be more precise, resulting in more precise cargo box temperature control.

In some embodiments, the TRU may be configured to include an electrically powered refrigeration module including a compressor, a gas cooler equipped with an electric blower, an evaporator equipped with an electric blower, and an electrically controlled main expansion valve to control a refrigerant flow into the evaporator. These components are configured to form a refrigeration circuit, in which the refrigerant is circulated.

In some embodiments, the TRU may also include a power regulator circuit. The power regulator circuit may be configured to provide one or more variable DC and/or AC outputs to supply electrical power to the components of the refrigeration circuit. In some embodiments, the power regulator circuit may be configured to provide variable DC voltages, and/or variable AC voltages and/or frequencies. In some embodiments, the power regulator circuit can be configured to draw power from an electric grid of a tractor, an auxiliary power unit of a tractor, a genset, and/or an electric power outlet.

In some embodiments, the TRU may include a control circuit that is configured to control the operation of the TRU.

In some embodiments, the control circuit may be configured to receive instructions from a human machine interface. In some embodiments, the control circuit may be configured to receive temperature/pressure readings from temperature/pressure sensors of the refrigeration circuit. In some embodiments, the control circuit may be configured to interface with a global positioning system and/or a mobile wireless network. The control circuit may be configured to determine the DC voltages, and/or the AC voltages and/or frequencies so as to control the operation of the components of the refrigeration circuit.

Other features and aspects of the embodiments will become apparent by consideration of the following detailed description and accompanying drawings.

BRIEF DESCRIPTION OF THE DRAWINGS

FIG. 4A is a front view of the TRU. FIG. 4B is a front internal view of the TRU with a front cover of the TRU removed. FIG. 4C is a back side view of the TRU.

DETAILED DESCRIPTION

A refrigerant used in a typical TRU is R404A. A TRU using R404A refrigerant generally includes an internal combustion engine, such as a diesel engine, to drive a compressor. The TRU generally also includes a belt system to drive condenser and evaporator blowers of the TRU by the engine. The use of the chemical refrigerant R404A and the use of fuel-burning combustion engine can result in a relatively high environment impact, causing, for example, a high Global Warming Potential (GWP) and/or other environmental impacts.

In the following description, a TRU configured to be electrically powered to eliminate the need for an internal combustion engine, such as a diesel engine, is described. The TRU may be configured to use a natural refrigerant, such as e.g. R744 ($CO_2$), which is a refrigerant with a relatively low GWP (GWP is about 1 for R744). In some embodiments, the TRU may include, for example, a compressor, a gas cooler, an evaporator, blowers and an expansion valve. In some embodiments, the TRU may also include an inter cooler, an economizer heat exchanger, a main expansion valve (EXV), an auxiliary expansion valve (AXV) and/or heating rods. In some embodiments, the compressor may be a two-stage open shaft, semi-hermetic or hermetic compressor. The TRU can be controlled electrically by a controller that is configured to receive information from one or more sensors and make control decisions based on the information received. In some embodiments, the sensors can be configured to measure refrigerant temperatures/pressures at a gas cooler outlet and/or an evaporator outlet. In some embodiments, speeds of the compressor and/or blower can be controlled to regulate a compressor discharge pressure. In some embodiments, EXV can be controlled to regulate parameters, such as a compressor suction temperature/pressure or an evaporator pressure. In some embodiments, AXV can be controlled to regulate a compressor inter-medium pressure. Components of the TRU can be arranged in a frame that is configured to be attached to a transport unit, such as a trailer, a container, a railroad car, etc.

References are made to the accompanying drawings that form a part hereof, and in which is shown by way of illustration of the embodiments in which the embodiments may be practiced. It is to be understood that the terms used herein are for the purpose of describing the figures and embodiments and should not be regarding as limiting the scope of the present application.

Figure 1:
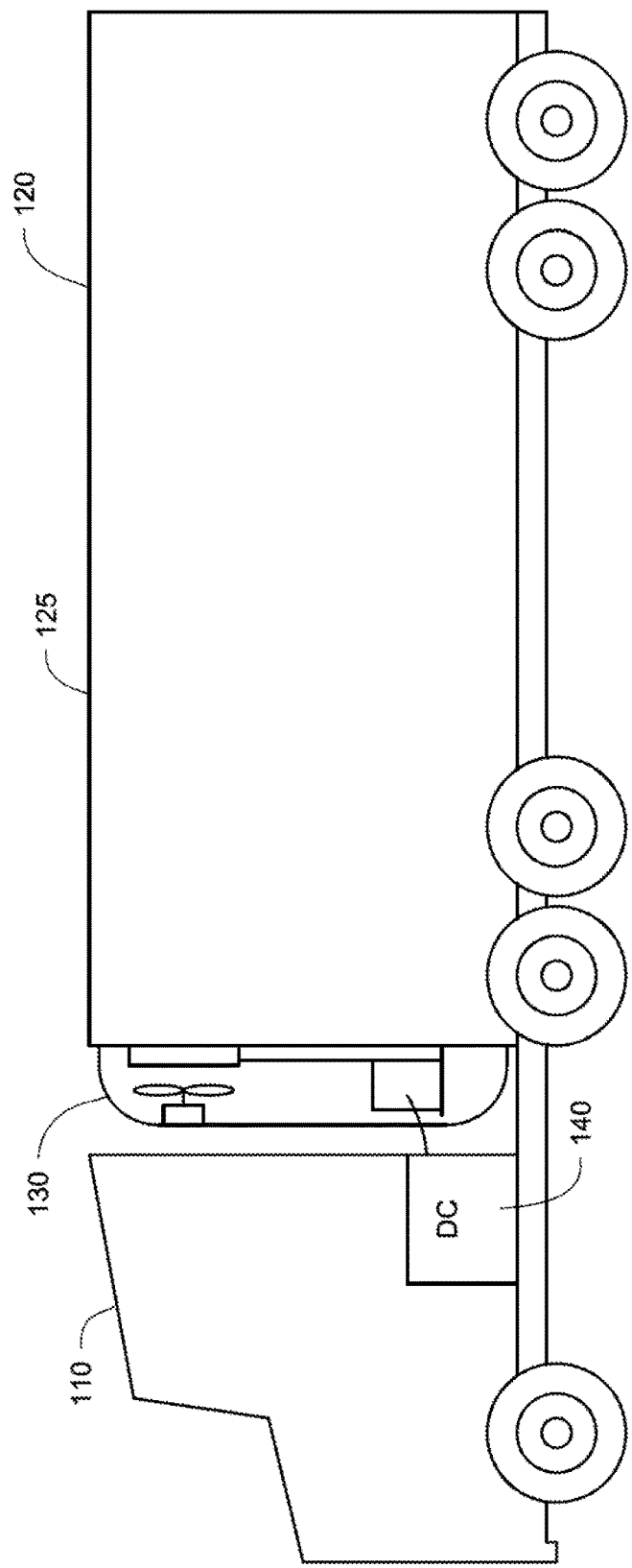
FIG. 1 illustrates a side view of semi-trailer truck equipped with a transport refrigeration unit.

Embodiments as described herein can be generally used in a temperature controlled semi-trailer truck 100 as illustrated in FIG. 1. The semi-trailer truck 100 has a tractor unit 110 that is configured to tow a transport unit 120 including a TRS 125. The TRS. 125 includes a TRU 130 installed on a side wall of the transport unit 120. The TRU 130 can be configured to include an electrically powered refrigeration module, such as an electrically powered refrigeration module 200 as described in FIG. 2. The refrigeration module of the TRU 130 can be configured to be powered by an electrical grid 140, which can draw power from an alternator and/or converter of the tractor unit 110, and/or an auxiliary power unit (APU) of the tractor unit 110. The TRU 130 can also be configured to be powered by a separate external genset or an electricity power outlet. Using an electrically powered refrigeration module in the TRU 130 may help reduce environmental impacts of the TRU 130 as well as help reduce operational noise. The electrically powered TRU may also help provide precise box temperature control of the tractor unit 110, and/or help optimize energy consumption of the TRU 130. Further, the electrically powered TRU 130 typically has a lower weight than a TRU that is powered by a combustion engine.

It is to be noted that the embodiment as illustrated in FIG. 1 is exemplary. The TRU 130 can also be configured to work with other types of transport units, for example, a container and a railroad car.

Figure 2:
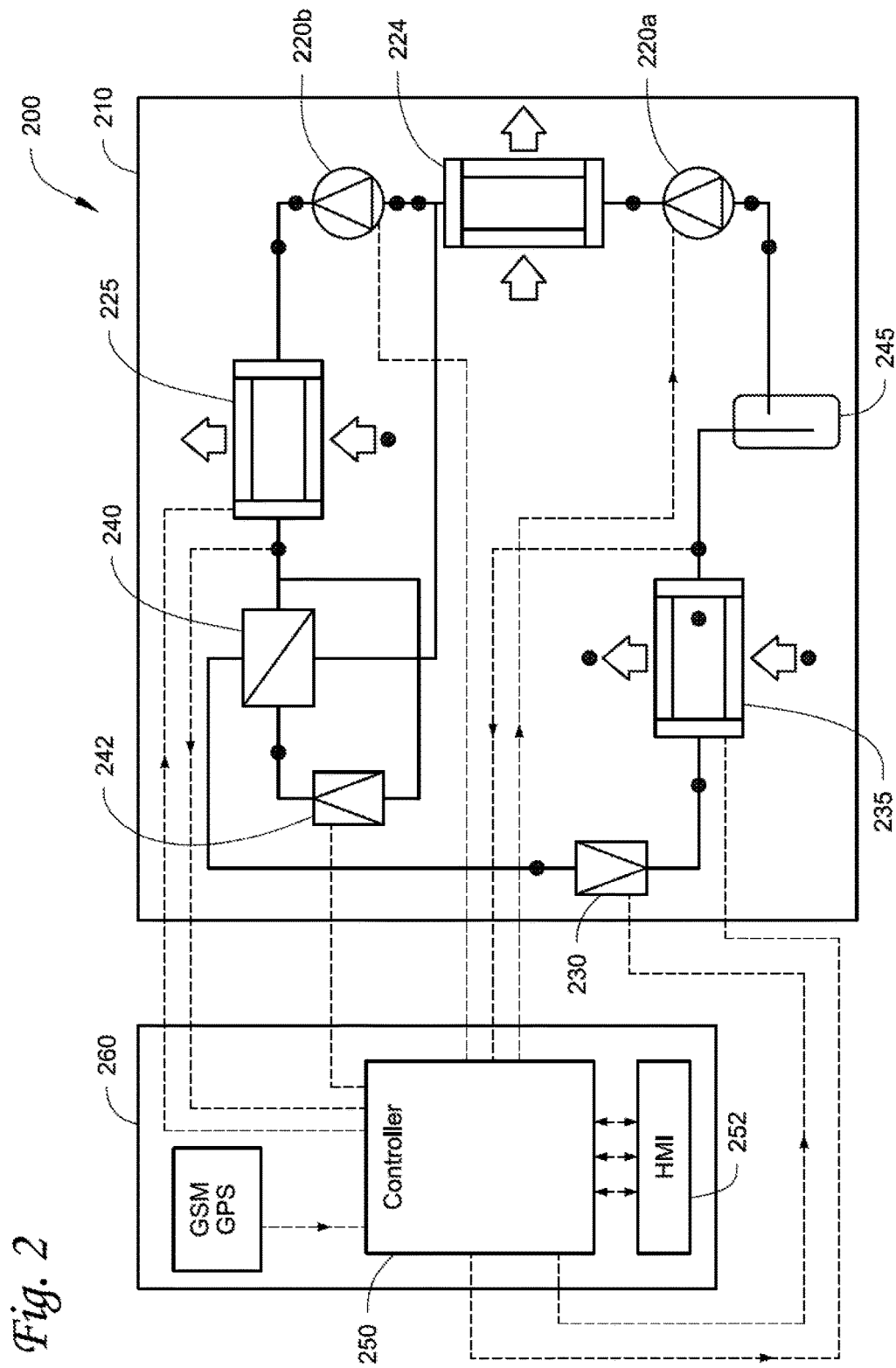
FIG. 2 illustrates a block diagram of an electrically powered refrigeration module according to one embodiment.

FIG. 2 illustrates components of an embodiment of an electrically powered refrigeration module 200, which can be included in a TRU (such as the TRU 130 as illustrated in FIG. 1). The refrigeration module 200 includes an electrically powered refrigeration circuit 210 and a control circuit 260.

In the illustrated embodiment, the refrigeration circuit 210 can be configured to use a natural refrigerant, such as e.g. R744, as refrigerant. The refrigerant circuit 210 includes a first stage compressor 220a, a second stage compressor 220b, an inter-cooler 224 positioned between the first and second stage compressors 220a and 220b, a gas cooler 225 positioned downstream of the second stage compressor 220b, a main expansion valve 230 and an evaporator 235, forming a refrigeration cycle. The refrigerant circuit 210 also includes an economizer 240, an auxiliary expansion valve 242 for the economizer 240, and a liquid separator 245. The first and second stage compressors 220a and 220b can be configured to be driven by one or more electric motors (not shown). The main expansion valve 230 and the auxiliary expansion valve 242 can be configured to be an electro-magnetic actuated expansion valve, and/or a mechanical expansion valve. The inter-cooler 224, the gas cooler 225 and the evaporator 235 can be equipped with electric blowers to facilitate heat transfer. Consequently, the refrigeration circuit 210 can be configured to be powered by electricity entirely, eliminating the need for an internal combustion engine, such as a diesel engine.

The compressors 220a and 220b may be a semi-hermetic compressor. It is to be appreciated that the refrigeration circuit 210 as illustrated in FIG. 2 is exemplary. In some embodiments, the refrigerant circuit may be configured to only have one compressor. In some embodiments, the refrigerant circuit may be configured to have a compressor that integrates two stage compression, such as a two-stage semi-hermetic compressor. In some embodiments, the refrigeration system may be configured to not have an inter-cooler. In some embodiments, the refrigeration system may be configured to use other refrigerants with a relatively low GWP, such as hydrocarbons, ammonia or other suitable types of refrigerant. Generally, the refrigeration system is configured to be electrically powered, and use refrigerant that has a relatively low GWP.

The control circuit 260 is configured to control the refrigerant circuit 210. In the exemplary embodiment as illustrated in FIG. 2, the control circuit 260 includes a TRS controller 250, which may be a computer. The TRS controller 250 is configured to communicate with a human machine interface (HMI) 252. The HMI 252 may be configured to receive user inputs and communicate the user inputs to the TRS controller 250.

The TRS controller 250 can be configured to receive information from various sources. In the exemplary embodiment as illustrated in FIG. 2, the TRS controller 250 is configured to receive information from temperature and/or pressure sensors (represented by block dots in FIG. 2) positioned at an outlet of the gas cooler 225 and an outlet of the evaporator 235. The temperature and/or pressure sensors can be configured to measure, for example, temperatures and/or pressures of the refrigerant.

The TRS controller 250 can also be configured to control the electric motors that drive the first and second stage compressor 220a and 220b so as to control the compression ratio of each compressor 220a or 220b. The TRS controller 250 can be further configured to control the blower speeds of the inter-cooler 224, the gas-cooler 225 and/or the evaporator 235. By controlling the blower speeds, heat transfer rates of the inter-cooler 224, the gas-cooler 225 and/or the evaporator 235 can be controlled.

The TRS controller 250 can also be configured to control the main expansion valve 230 and/or the auxiliary expansion valve 242, so as to control an amount of refrigerant flowing into the evaporator 235 and/or the economizer 240 respectively.

In operation, the TRS controller 250 can receive instructions from the HMI 252 and the temperature and/or pressure readings of the refrigerant from the temperature and/or pressure sensors, and determine operation parameters for the refrigerant circuit 210, such as the speeds of the electric motors for the compressors 220a, 220b, the speeds of blowers (not shown) of the inter-cooler 224, the gas cooler 225 and/or the evaporator 235, and/or the actuation of the main expansion valves 230 and the auxiliary expansion valve 242.

By controlling the speeds of the motors for the compressors 220a and/or 220b, the discharge temperature/pressure coming out of the compressors 220a and/or 220b can be regulated. By controlling the blower speeds of the inter-cooler 224, the gas cooler 225 and/or the evaporator 235, the heat transfer rates of the inter-cooler 224, the gas cooler 225 and/or the evaporator 235 can be controlled. By controlling the actuations of the main expansion valve 230, the suction temperature/pressure of the compressors 220a and/or 220b can be regulated. By controlling the auxiliary expansion valve 242, the inter-medium temperature/pressure of the compressors 220a and 220b can also be controlled. These operation parameters for components of the refrigerant circuit 210 can be determined in real time during operation to help improve the operation efficiency of the refrigerant circuit 210.

In some embodiments, the TRS controller 250 may be configured to receive global positioning system (GPS) information from a GPS receiver, so that the operation parameters of the refrigeration system 210 can be determined according to the physical location of the refrigeration module 200. In some embodiments, the TRS controller 250 may be configured to communicate with a mobile network, such as a GSM network, so that the TRS controller 250 can be controlled and/or monitored remotely through the mobile network.

It is to be appreciated that the embodiment as illustrated in FIG. 2 is exemplary. The control circuit 220 can be configured to receive information from other suitable sources (e.g. box temperature sensors, ambient temperature sensors, etc.), and/or control other components of the refrigeration module 200.

Figure 3:
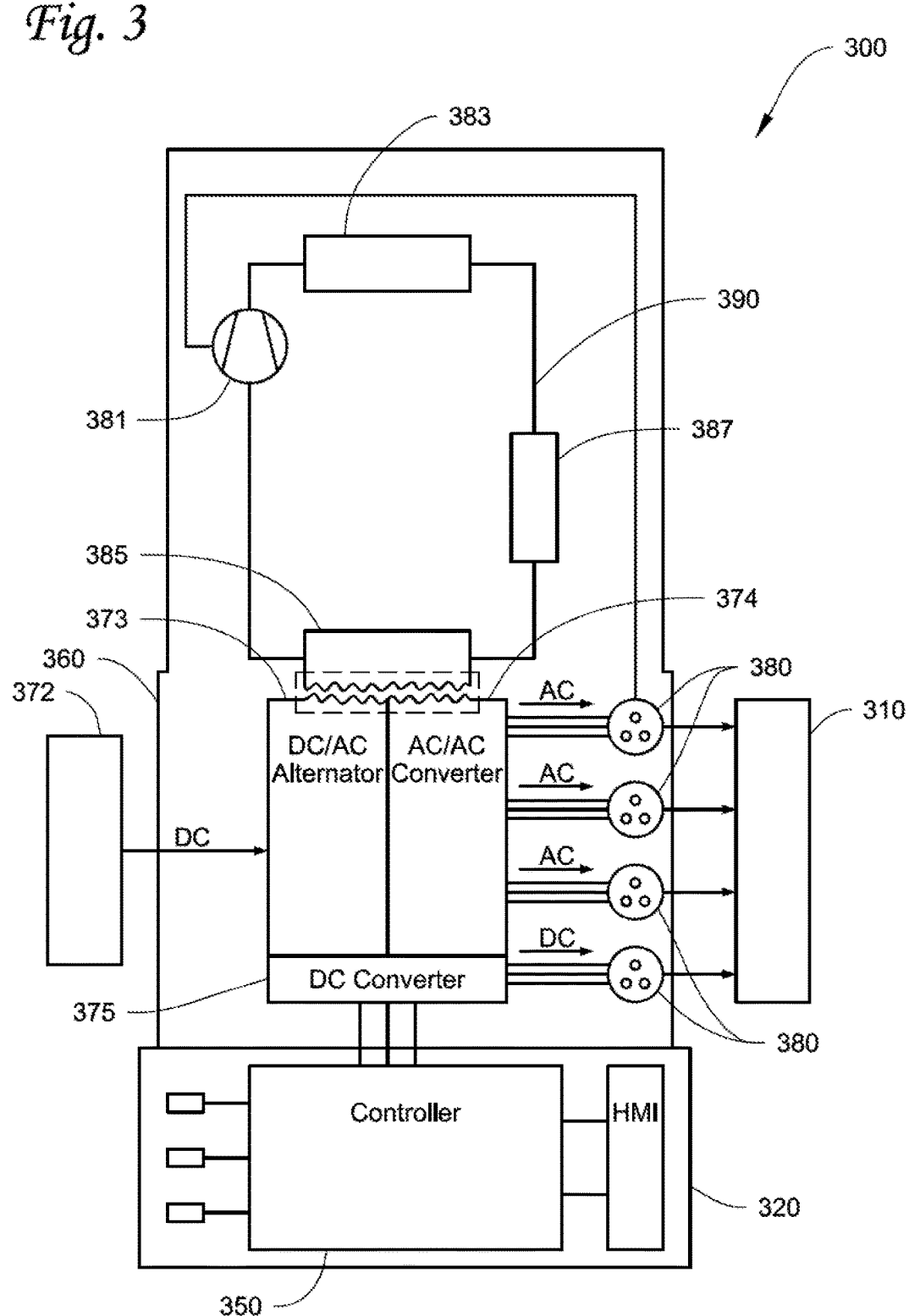
FIG. 3 illustrates another embodiment of an electrically powered refrigeration module.

FIG. 3 illustrates another embodiment of an electrically powered refrigeration module 300 that includes a power regulating circuit 360 that is configured to be coupled to a controller circuit 320 and a refrigeration circuit 310. The controller circuit 320 may be configured similar to the control circuit 260 as illustrated in FIG. 2, and the refrigeration circuit 310 may be configured similar to the refrigeration circuit 210 as illustrated in FIG. 2.

The power regulating circuit 360 is configured to receive an electric power supply, such as a DC power, from a power supply 372. The power supply 372 can be, for example, a power grid of a tractor (e.g. the power grid 140 as shown in FIG. 1), a genset, a APU, an electricity power outlet, or other suitable power supplier or storage units. Accordingly, an internal combustion engine, such as a diesel engine, may not be necessary to power the refrigeration module 300.

The power regulating circuit 360 is configured to have a DC/AC alternator(s) 373, an AC/AC converter(s) 374, and a DC converter(s) 375. The DC/AC alternator(s) 373, the AC/AC converter(s) 374, and/or the DC converter(s) 375 is configured to provide one or more electrical outputs with variable voltages and/or frequencies, and is configured to be controlled by the controller circuit 320. For example, a TRS controller 350 can be configured to interface with the DC/AC alternator(s) 373, the AC/AC converter(s) 374, and/or the DC converter(s) 375 and vary values for voltages and/or frequencies of the variable DC, AC outputs 380. These variable DC, AC outputs 380 are configured to provide power supplies to various components of the refrigeration circuit 310.

It is to be appreciated that the power regulating circuit can be configured to include all of the DC/AC alternator(s), AC/AC converter(s) and/or DC converter(s), or any combinations of these alternator(s) and/or converter(s). The combination of DC/AC alternator(s), AC/AC converter(s). DC converters or other suitable converters and alternators allows one or more DC and/or AC power supplies to be provided by a power regulator circuit.

In operation, the control circuit 320 can determine the voltage and/or the frequency of each of the outputs 380 supplied to a component of the refrigeration circuit 310, so that operation of different components can be regulated by the control circuit 320. For example, by setting the voltage and/or frequency of an AC power supplied to a motor (not shown) of a compressor (e.g. the compressor 220*a* in FIG. 2), a speed of the motor can be regulated by the control circuit 320. Similarly, blower speeds for a gas cooler (e.g. the gas cooler 225) and/or an inter-cooler (e.g. the inter-cooler 224) can be regulated by the controller 350, thus operation of the gas cooler and/or the inter-cooler can be controlled by the control circuit 320. By setting the voltage of a DC power supplied to an expansion valve (e.g. the expansion valve 230 in FIG. 2), refrigerant flowing into an evaporator (e.g. the evaporator 235 in FIG. 2) can be regulated by the control circuit 320.

In some embodiments, all of the components in the refrigeration circuit 310 are configured to be electrically powered, eliminating the necessity of an internal combustion engine, such as a diesel engine. The control circuit 320 can control the operation of the refrigeration circuit 310 by controlling the power regulator circuit 360.

As illustrated in FIG. 3, the power regulator circuit 360 can also be configured to be coupled with a power regulator cooling circuit 390. The power regulator cooling circuit 390 includes a coolant pump 381, a coolant radiator 383, a coolant heat exchanger 385, and a coolant expansion tank 387. A coolant (not shown) circulating in the power regulator cooling circuit 390 can be water, glycerol, or any other suitable coolants.

In operation, the coolant heat exchanger 385 may be thermally coupled to the DC/AC alternator(s) 373, the AC/AC converter(s) 374, and/or the DC converter(s) 375 (as represented in FIG. 3 by the dashed rectangular box). The coolant pump 381, which may be powered by the power regulator circuit 360 that is controlled by the control circuit 320 (or TRS controller 350), circulates the coolant in the power regulator cooling unit 390. As a result, operational temperatures of the DC/AC alternator(s) 373, the AC/AC converter(s) 374, and/or the DC converter(s) 375 can be regulated by the TRS controller 350.

Figure 4A:
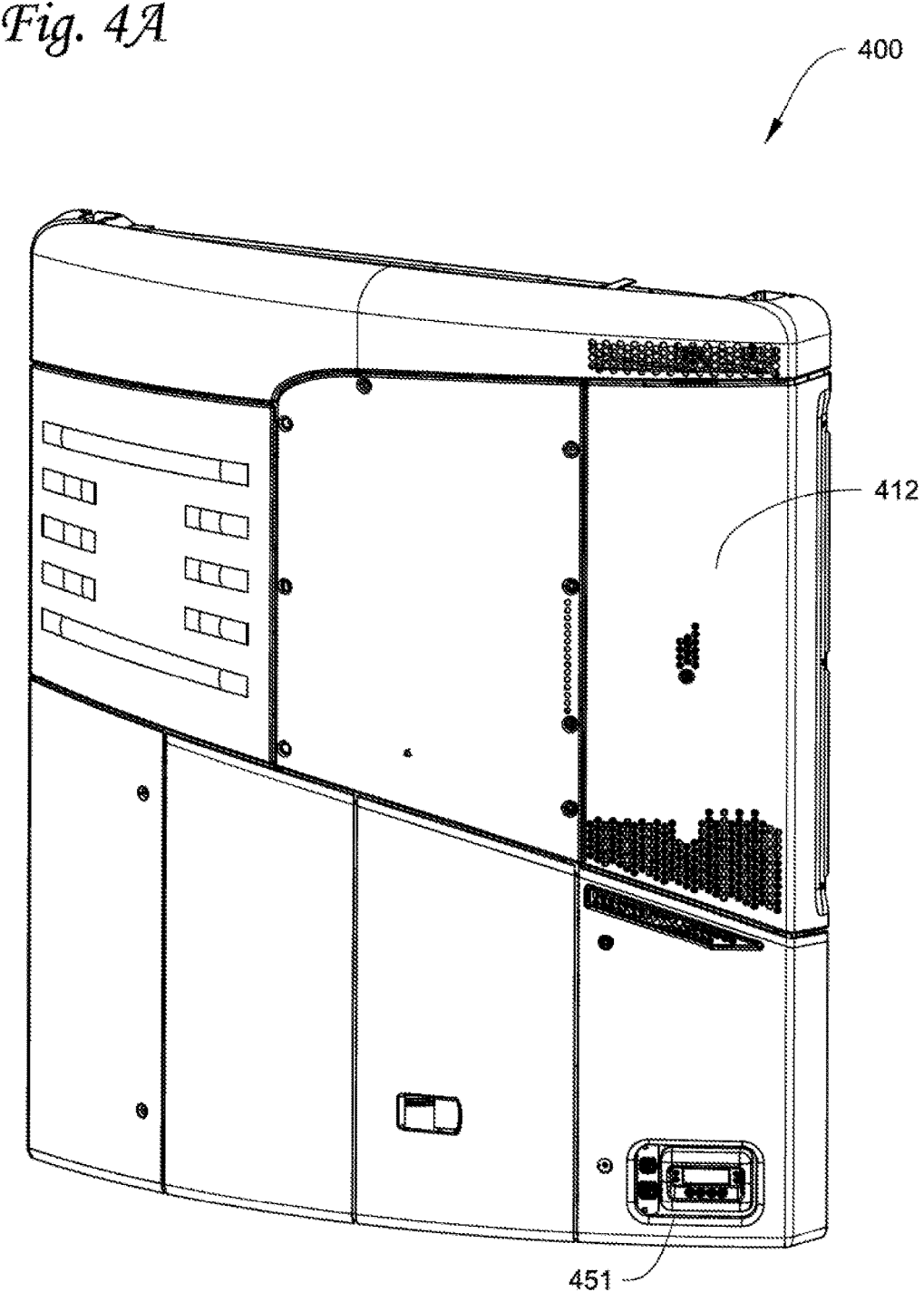
FIGS. 4A to 4C illustrate an embodiment of an electrically powered TRU.
Figure 4B:
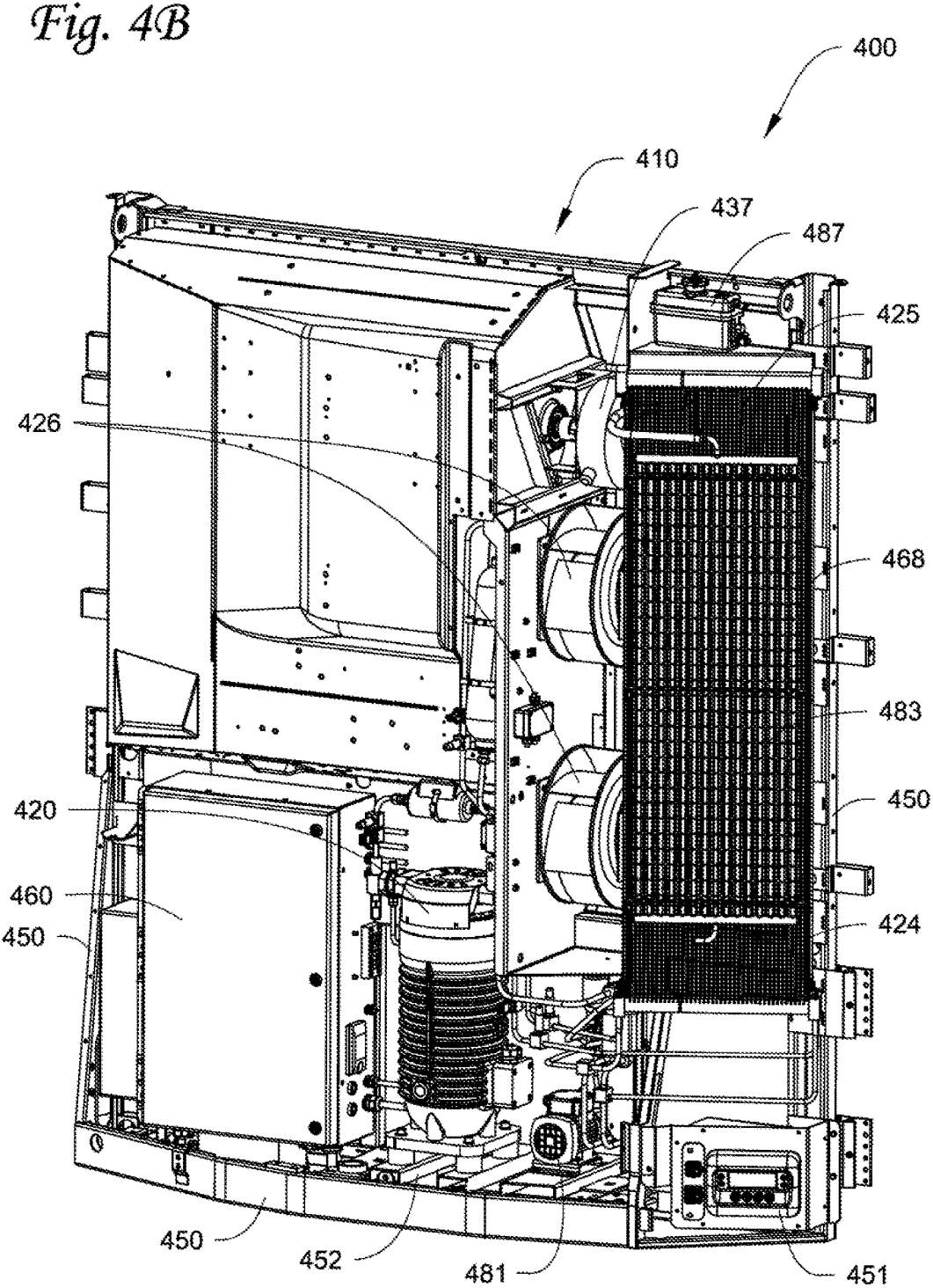
Figure 4C:
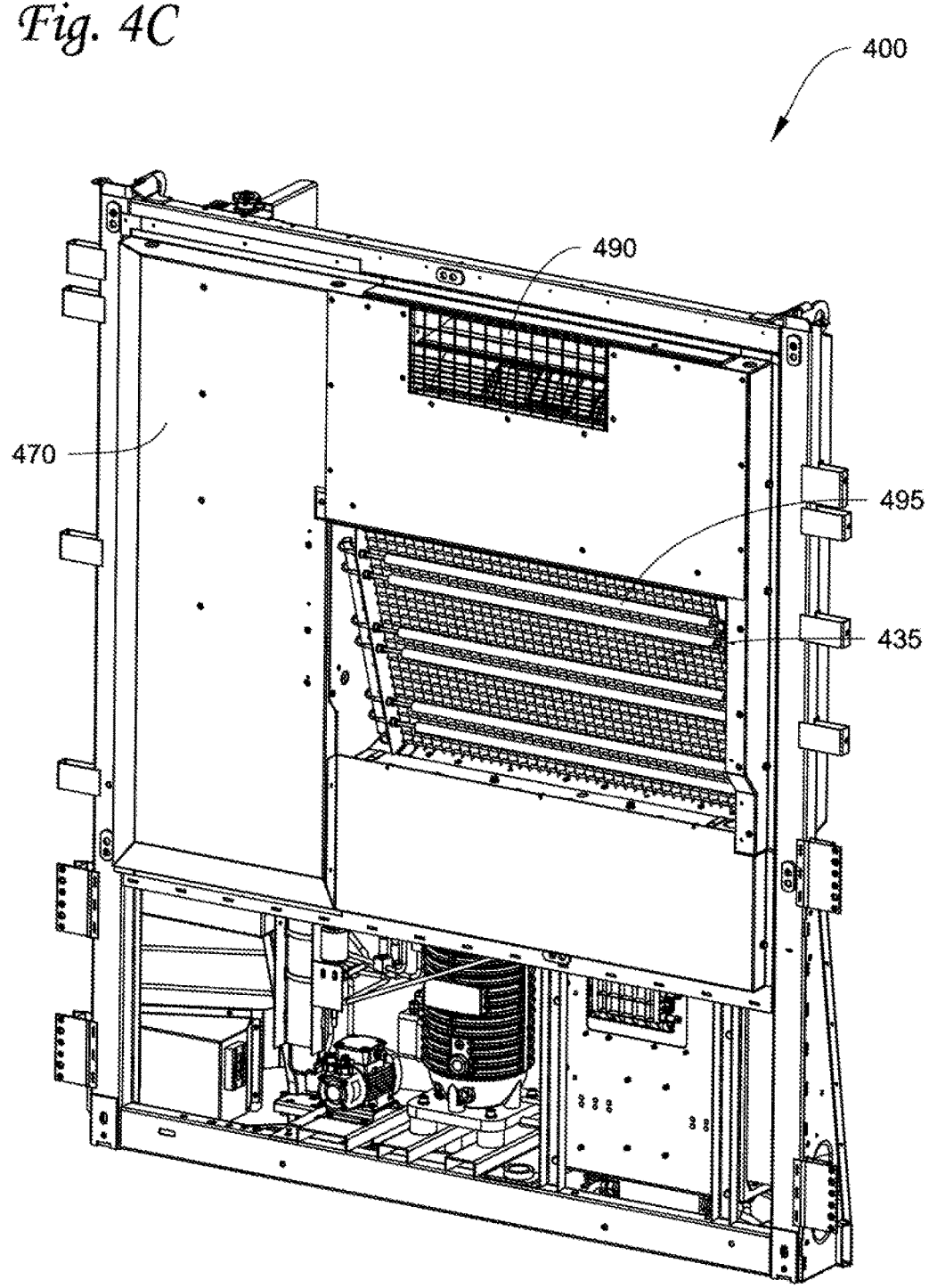

FIGS. 4A to 4C illustrate a TRU 400 that includes an electrically powered refrigeration module 410. (See FIG. 4B.) The TRU 400 can be attached to a trailer, a container, a railway car, or any other suitable transport units to regulate temperatures of internal spaces of these transport units. As illustrated in FIG. 4A, a front panel 412 is configured to cover the electrically powered refrigeration system 410. The front panel 412 is configured to allow access to a HMI 451.

As illustrated in FIG. 4B, which shows a front internal view of the TRU 400 with the front panel 412 as illustrated in FIG. 4A removed, some components of the electrically powered refrigeration system 410 are configured to be arranged on a frame 450 of the TRU 400. A compressor 420 is typically arranged at a lower portion 452 of the frame 450 of the TRU 400. The compressor 420 can be a compressor with two compression stages. In some embodiments, the TRU 400 can be configured to have a separate first stage compressor and second stage compressor.

An inter-cooler 424 and a gas cooler 425 can be arranged at a side of the TRU 400, with blowers 426 for the inter-cooler 424 and the gas cooler 425 typically positioned behind the inter-cooler 424 and the gas cooler 425. The blowers 426 are configured to move air through surfaces 468 of the inter-cooler 424 and the gas cooler 425 to help heat transfer.

The frame 450 of the TRU 400 also accommodates an evaporator blower 437, which is configured to move air through an evaporator 435 (as shown in FIG. 4C) and a cool air outlet 490 (as shown in FIG. 4C).

A control circuit (e.g. the control unit 320 in FIG. 3) and a power regulator circuit (e.g. the power regulator circuit 360) can be configured to be enclosed in a box 460.

Components of a power regulator cooling circuit (e.g. the power regulator cooling circuit 390 in FIG. 3), such as a coolant pump 481, a coolant radiator 483, and a coolant expansion tank 487, can also be arranged on the frame 450 of the TRU 400. In the embodiment as illustrated in FIG. 4B, the coolant radiator 483 is arranged so to at least partially overlap with the inter-cooler 424 and the gas cooler 425, so that the air moved by the blowers 426 can also help move air through the coolant radiator 483.

A back side view of the TRU 400 is illustrated in FIG. 4C. The back side 470 of the TRU 400 typically faces a transport unit (not shown), to which the TRU 400 is attached. The back side 470 of the TRU 400 includes the cool air outlet 490 that is generally in fluid communication with an internal space of the transport unit.

The TRU 400 may also be equipped with one or more heating rods 495, which can be positioned to be overlap with the evaporator 435 (as shown in FIG. 4B. The heating rods 495 can be configured to be electrically powered.

In a cooling operation, the evaporator blower 437 is configured to move air through the evaporator 435 to lower the temperature of the air, and circulates the cooled air into the internal space of the transport unit through the air outlet 490.

In a heating mode and/or a defrosting mode, the heating rods 495 can be powered on. The evaporator blower 437 can move air through the heating rods 495 to heat the air up so as to increase the temperature of the internal space of the transport unit, and/or remove frost. The heated air can be circulated into the internal space of the transport unit through the air outlet 490.

It is to be noted that the embodiment as shown in FIGS. 4A to 4C is merely exemplary. Other suitable arrangements can be applied. Generally, because the components in the refrigeration module can be configured to be electrically powered to eliminate the need for an internal combustion engine (e.g. a diesel engine), it is not necessary for the TRU to be configured to accommodate the internal combustion engine. Therefore, the profile and/or the weight of the TRU may be relatively smaller. Further, because each blower can be configured to be driven by a dedicated electric motor, there is no need to provide a belt system to drive the blowers. These features may help save manufacture costs and time associated with manufacturing and/or installing the TRU. Further, because individual components can be powered and/or driven independently, the arrangement of the components within the TRU can be more flexible.

With regard to the foregoing description, it is to be understood that changes may be made in detail, especially in matters of the construction materials employed and the shape, size and arrangement of the parts without departing from the scope of the present invention. It is intended that the specification and depicted embodiment to be considered exemplary only, with a true scope and spirit of the invention being indicated by the broad meaning of the claims.

ASPECTS

It is noted that any of aspects 1-11, 12-14 and 15-17 can be combined.

Aspect 1. A transport refrigeration unit comprising:
  an electrically powered refrigeration module that includes:
    an electrically powered first compressor,
    an evaporator equipped with a first electric blower, and
    an electrically controlled expansion valve configured to control a refrigerant flow into the evaporator; and
  a frame to support the electrically powered first compressor, the evaporator, the first electric blower, and the electrically controlled expansion valve,
  wherein the electrically powered first compressor, the evaporator and the expansion valve are configured to form a refrigeration circuit.

Aspect 2. The transport refrigeration unit of aspect 1, wherein the electrically powered refrigeration module further includes a gas cooler equipped with a second electric blower, wherein the gas cooler is configured to be part of the refrigeration circuit.

Aspect 3. The transport refrigeration unit of aspect 2, wherein refrigerant of the electrically powered transport refrigeration module is $CO_2$, and wherein the refrigerant is configured to circulate in the refrigeration circuit.

Aspect 4. The transport refrigeration unit of aspects 1-3, wherein the electrically powered first compressor is a semi-hermetic compressor.

Aspect 5. The transport refrigeration unit of aspects 1-4 further comprising: a power regulator circuit configured to supply variable DC and AC power outputs to the electrically powered first compressor, the first electric blower, and the electrically controlled expansion valve.

Aspect 6. The transport refrigeration unit of aspect 5, further comprising a control circuit configured to interface with the power regulator circuit, wherein the control circuit is configured to determine the DV voltage, and/or the AC voltage and/or a frequency of at least one of the DC and AC power outputs.

Aspect 7. The transport refrigeration unit of aspects 1-6, wherein the electrically powered first compressor is a two-stage semi-hermetic compressor.

Aspect 8. The transport refrigeration unit of aspect 2-7, wherein the electrically powered refrigeration module further includes an electrically powered second compressor positioned between the gas cooler and the electrically powered first compressor in the refrigeration circuit.

Aspect 9. The transport refrigeration unit of aspects 5-8, wherein the control circuit is configured to receive location information by a global positioning system.

Aspect 10. The transport refrigeration unit of aspects 1-9, wherein the electrically powered transport refrigeration module is configured to be powered by an electric grid of a tractor.

Aspect 11. The transport refrigeration unit of aspects 5-11, wherein the power regulator circuit is thermally coupled to a cooling circuit.

Aspect 12. An electrically powered refrigeration module of a transport refrigeration unit comprising:
  an electrically powered first compressor;
  an electrically powered second compressor;
  an inter-cooler;
  an evaporator equipped with a first electric blower; and
  an electrically controlled expansion valve configured to control a refrigerant flow into the evaporator;
  wherein the electrically powered first compressor, the electrically powered second compressor, the inter-cooler, the evaporator and the electrically controlled expansion valve are configured to form a refrigeration circuit, and the inter-cooler is positioned between the electrically powered first compressor and the electrically powered second compressor in the refrigeration circuit.

Aspect 13. The electrically powered refrigeration module of aspect 12, further comprising $CO_2$ as a refrigerant.

Aspect 14. The electrically powered refrigeration module of aspects 11-12, further comprising at least one electrically powered heating rod.

Aspect 15. An electrically powered refrigeration module of a transport refrigeration unit comprising:
- a $CO_2$ compressor including a first compression stage and a second compression stage;
- the $CO_2$ compressor including an inter-cooler positioned between the first compression stage and the second compression stage;
- an electrically controlled expansion valve configured to control a refrigerant flow into an evaporator; and
- a power regulating circuit configured to provide a AC power to the $CO_2$ compressor and a DC power to the electrically controlled expansion valve.

Aspect 16. The electrically powered refrigeration module of a transport refrigeration unit of aspect 15, further comprising an electrical compressor motor configured to drive the first and second compression stages.

Aspect 17. The electrically powered refrigeration module of a transport refrigeration unit of aspects 15-16, further comprising
a power regulator cooling circuit that is coupled to the power regulator circuit, wherein the power regulator cooling circuit includes a coolant pump, a coolant radiator, a coolant heat exchanger, and a coolant expansion tank;
wherein the coolant heat exchanger forms a heat exchange relationship with the power regulator circuit.

The invention claimed is:

1. A transport refrigeration unit comprising:
an electrically powered refrigeration module that includes:
   an electrically powered first compressor,
   an evaporator equipped with a first electric blower, and
   an electrically controlled expansion valve configured to control a refrigerant flow into the evaporator;
a frame to support the electrically powered first compressor, the evaporator, the first electric blower, and the electrically controlled expansion valve;
a power regulator circuit configured to, while in transport, receive power solely from an electric power supply and configured to supply DC and AC power having variable voltages and/or frequencies to the electrically powered first compressor, the first electric blower, and the electrically controlled expansion valve so as to power the electrically powered refrigeration module,
wherein the electrically powered first compressor, the evaporator and the expansion valve are configured to form a refrigeration circuit.

2. The transport refrigeration unit of claim 1, wherein the electrically powered refrigeration module further includes a gas cooler equipped with a second electric blower, wherein the gas cooler is configured to be part of the refrigeration circuit.

3. The transport refrigeration unit of claim 2, wherein the electrically powered refrigeration module further includes an electrically powered second compressor positioned between the gas cooler and the electrically powered first compressor in the refrigeration circuit.

4. The transport refrigeration unit of claim 1, wherein refrigerant of the electrically powered transport refrigeration module is $CO_2$, and wherein the refrigerant is configured to circulate in the refrigeration circuit.

5. The transport refrigeration unit of claim 1, wherein refrigerant of the electrically powered transport refrigeration module is R744, and wherein the refrigerant is configured to circulate in the refrigeration circuit.

6. The transport refrigeration unit of claim 1, further comprising a control circuit configured to interface with the power regulator circuit, wherein the control circuit is configured to determine the DC voltage, and/or the AC voltage and/or a frequency of at least one of the DC and AC power having variable voltages and/or frequencies.

7. The transport refrigeration unit of claim 1, wherein refrigerant of the electrically powered transport refrigeration module has a Global Warming Potential (GWP) of about 1, and wherein the refrigerant is configured to circulate in the refrigeration circuit.

8. The transport refrigeration unit of claim 1, wherein the power regulator circuit includes a DC/AC alternator, an AC/AC converter, a DC converter, and a plurality of variable DC, AC outputs connected to one or more of the DC/AC alternator, the AC/AC converter and the DC converter, wherein the DC/AC alternator, the AC/AC converter and the DC converter are each configured to receive electric power from the electric power supply and convert the received electric power into the DC and AC power that is then sent by one or more of the plurality of variable DC, AC outputs to the electrically powered first compressor, the first electric blower, and the electrically controlled expansion valve.

9. The transport refrigeration unit of claim 8, further comprising a control circuit configured to interface with the DC/AC alternator, the AC/AC converter and the DC converter and to vary the DC and AC power sent through each of the plurality of DC, AC outputs.

10. The transport refrigeration unit of claim 1, further comprising a power regulator cooling circuit that is thermally coupled to the power regulator circuit to regulate an operational temperature of the power regulating circuit, wherein the power regulator cooling circuit includes a coolant pump, a coolant radiator, a coolant heat exchanger, and a coolant expansion tank;
wherein the coolant heat exchanger forms a heat exchange relationship with the power regulator circuit.

11. An electrically powered refrigeration module of a transport refrigeration unit comprising:
an electrically powered compressor including a first stage compressor, a second stage compressor, and an inter-cooler positioned between the first stage compressor and the second stage compressor;
an evaporator equipped with a first electric blower; and
an electrically controlled expansion valve configured to control a refrigerant flow into the evaporator;
wherein the electrically powered first compressor, the electrically powered second compressor, the inter-cooler, the evaporator and the electrically controlled expansion valve are configured to form a refrigeration circuit,
a power regulator circuit configured to, while in transport, receive power solely from an electric power supply and configured to supply DC and AC power having variable voltages and/or frequencies to the electrically powered compressor, the first electric blower, and the electrically controlled expansion valve so as to power the electrically powered refrigeration module.

12. The electrically powered refrigeration module of claim 11, further comprising $CO_2$ as a refrigerant.

13. The electrically powered refrigeration module of claim 11, further comprising R744 as a refrigerant.

14. The electrically powered refrigeration module of claim 11, wherein refrigerant of the electrically powered transport refrigeration module has a Global Warming Potential (GWP) of about 1.

15. The electrically powered refrigeration module of claim 11, wherein the power regulator circuit includes a DC/AC alternator, an AC/AC converter, a DC converter, and a plurality of variable DC, AC outputs connected to one or more of the DC/AC alternator, the AC/AC converter and the DC converter, wherein the DC/AC alternator, the AC/AC converter and the DC converter are each configured to receive electric power from the electric power supply and convert the received electric power into the DC and AC power that is then sent by one or more of the plurality of variable DC, AC outputs to the electrically powered first compressor, the first electric blower, and the electrically controlled expansion valve.

16. An electrically powered refrigeration module of a transport refrigeration unit comprising:
   an electrically powered refrigeration circuit that provides temperature control to a transport unit, the electrically powered refrigeration circuit including:
      a $CO_2$ compressor including a first compression stage and a second compression stage;
      the $CO_2$ compressor including an inter-cooler positioned between the first compression stage and the second compression stage;
      an electrically controlled expansion valve configured to control a refrigerant flow into an evaporator; and
   a power regulating circuit that powers the electrically powered refrigeration circuit, wherein the power regulating circuit, while in transport, receives power solely from an electric power supply and wherein the power regulating circuit is configured to provide a AC power having a variable voltage or frequency to the $CO_2$ compressor and a DC power having a variable voltage to the electrically controlled expansion valve so as to power the electrically powered refrigeration module.

17. The electrically powered refrigeration module of the transport refrigeration unit of claim 16, further comprising an electrical compressor motor configured to drive the first and second compression stages.

* * * * *